Feb. 18, 1936.  G. G. WEBER ET AL  2,031,021
HARVESTER THRESHER CANVAS
Filed Sept. 22, 1934   2 Sheets-Sheet 2
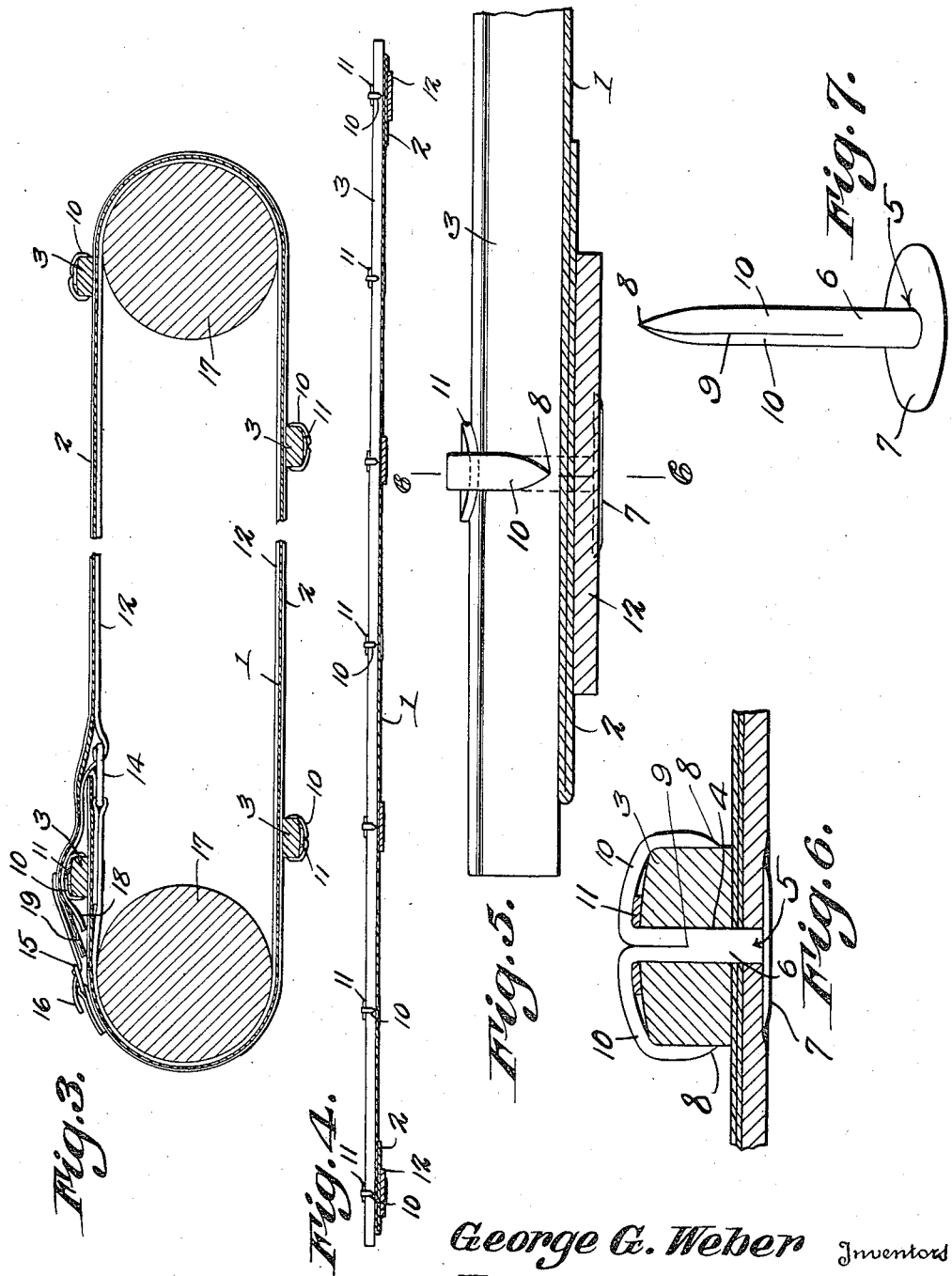
George G. Weber
James Merryweather
Inventors
By C. A. Snow & Co.
Attorneys.

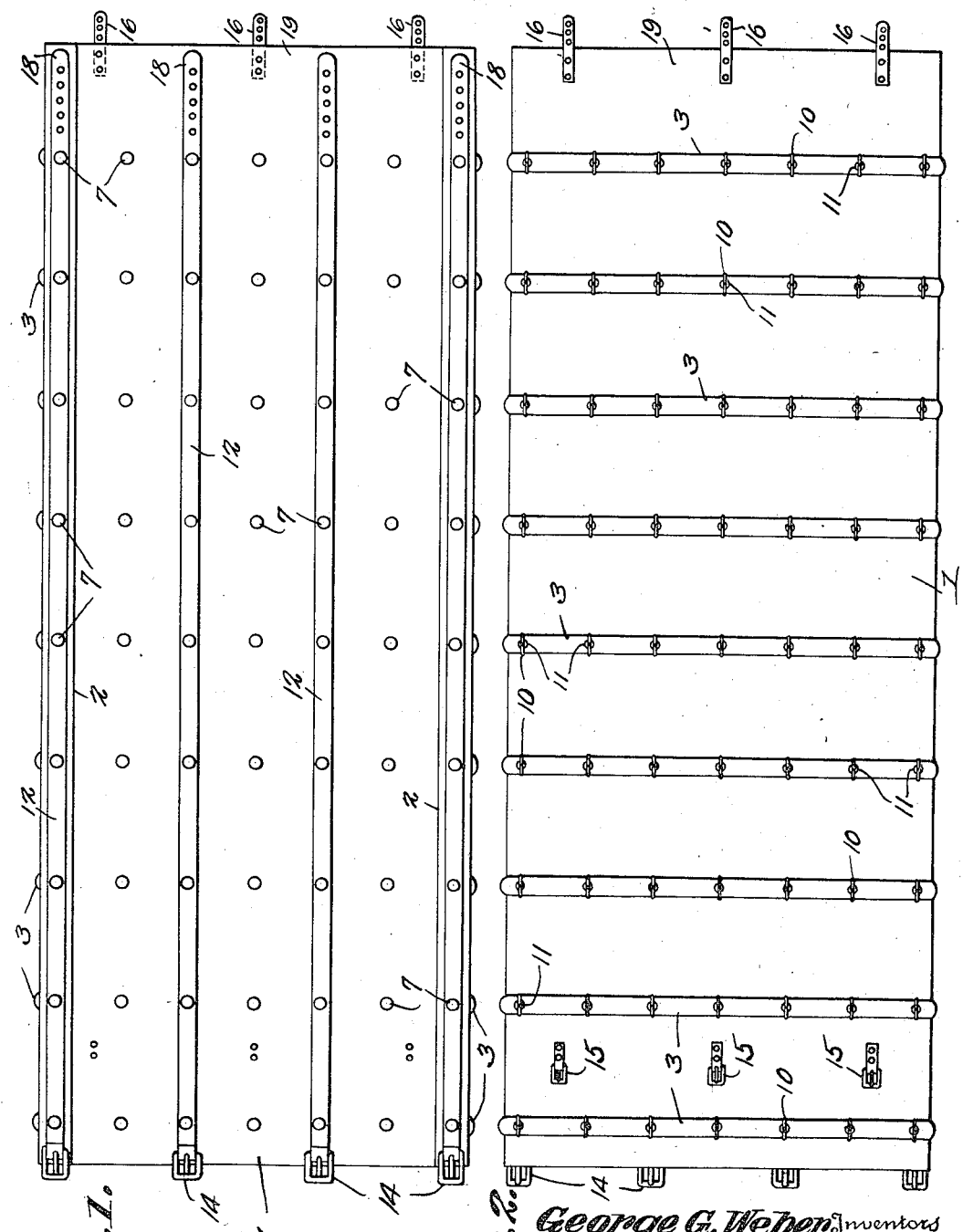

Patented Feb. 18, 1936

2,031,021

UNITED STATES PATENT OFFICE 2,031,021

HARVESTER THRESHER CANVAS

George Godisp Weber and James Merryweather, Greencastle, Ind.

Application September 22, 1934, Serial No. 745,151

1 Claim. (Cl. 198—199)

The device forming the subject matter of this application is a canvas or belt, used as a conveyor on threshing machines and the like. The invention aims to provide novel means for securing the slats to the body of the belt detachably but securely, so that a slat can be put on or taken off without difficulty. Another object of the invention is to provide novel means for securing together the ends of the body of the belt. A further object of the invention is to provide novel means for reinforcing the body of the belt.

In the drawings:

Fig. 1 shows in bottom plan, a conveyor belt constructed in accordance with the invention, Fig. 2 is a top plan, Fig. 3 is a longitudinal section showing the belt assembled with a pair of rollers, Fig. 4 is a transverse section, Fig. 5 is a detail enlarged from Fig. 4, Fig. 6 is a section on the line 6—6 of Fig. 5, and Fig. 7 is a perspective view showing one of the fasteners.

The numeral 1 marks the body of a conveyor belt, the body usually being made of canvas or other flexible material. The side portions of the body 1 are turned inwardly, to form underlying wings 2, so that the body 1 will not have raw longitudinal edges. Transverse slats 3 are placed on the working surface of the body 1, and generally are made of wood. There are holes 4 through the slats 3.

Metal fasteners 5 are provided. Each fastener 5 includes a shank 6 and a head 7. The shank 6 is pointed as shown at 8. The shank 6 is divided longitudinally, as shown at 9, at its pointed end, to form laterally bendable prongs 10.

The pointed end 8 of the fastener 5 is forced through the body 1 and is inserted through the hole 4 in the slat 3. A washer 11 is mounted on the shank 6 of the fastener 5, on top of the slat 3, and the prongs 10 are bent laterally in opposite directions, to engage the washer 11, the ends of the prongs 10 overlapping the sides of the slat 3 as shown in Fig. 6. It will be obvious that a simple means is provided for holding the slats 3 on the body 1, without the use of rivets or the like. The slats 3 are securely held in place, but any of them may be taken off for replacement or repair. Some of the fasteners 5 pass through the wings 2, and hold them in the under-folded position of Figs. 5 and 1.

Main straps 12 extend longitudinally of the body 1, and are made of flexible material. The main straps 12 are held in place by the heads 7 of some of the fasteners 5. The outermost straps 12 are mounted on the wings 2. The straps 12 are on one surface of the body 1, and the slats 3 are on the opposite surface thereof. Each strap 12 has a buckle 14 at one end, the opposite end 18 of each strap 12 being free, for engagement with the buckle 14.

Auxiliary buckles 15 are secured to the working surface of the body 1 between the slats 3 that are nearest to the end of the body 1 that has the buckle 14. Projecting auxiliary straps 16 are mounted on that end of the body 1 which is remote from the buckles 15.

The conveyor rollers are shown at 17 in Fig. 3. The belt is placed about them the ends 18 of the straps 12 being engaged with the buckles 14. One end 19 of the body 1 of the belt is overlapped on the slat 3 at the opposite end of the body of the belt and the straps 16 are engaged with the buckles 15. Thus, the conveyor belt is held securely in the looped form of Fig. 3.

Attention is again called to the fact that the fasteners 5 form a very convenient means for fastening the slats 3 to the body 1 of the belt, securely but removably. No rivets or other similar permanent fastenings are required. Some of the fasteners 5 have a double function in that they hold the wings 2 folded upon the body 1. Others of the fasteners 5 also have a double function in that they retain the straps 12.

Attention is directed to the washer 11. The washer 11 is placed on top of the slat 3. When the fastener 5 is thrust through the hole 4, and through the washer 11, and is bent laterally, in opposite directions, as shown in Fig. 6, two results are produced. The fastener 5 is prevented from splitting the slat 3, and the fastener is prevented from spreading apart, within the slat 3.

A preferred embodiment of the invention has been shown and described, but a mechanic who keeps within the scope of the claims can make such changes as his skill may direct, without departing from the spirit of the invention.

Having thus described the invention, what is claimed is:

A conveyor belt comprising a body, slats on the body; and fasteners each comprising a shank passing through the body and through a slat, the shank having a head cooperating with the body, the shank having a longitudinal slit terminating within the slat and leaving a portion of the shank solid within the slat, the slit defining bendable prongs, the shank having inclined surfaces defining a point at the end of the shank and enabling the prongs to pierce the body, the prongs being extended laterally in opposite directions, and being extended along the sides of the slats, toward the body, the ends of the prongs terminating on the sides of the slats, near to the body but spaced therefrom, the said inclined surfaces then slanting toward the slat.

GEORGE GODISP WEBER.
JAMES MERRYWEATHER.